United States Patent [19]

Holsinger et al.

[11] 4,076,961

[45] Feb. 28, 1978

[54] AUTOMATIC SWITCHING UNIT FOR DATA COMMUNICATIONS NETWORK

[75] Inventors: Jerry L. Holsinger, Boston; David E. Williams, Andover, both of Mass.

[73] Assignee: Intertel, Inc., Burlington, Mass.

[21] Appl. No.: 665,256

[22] Filed: Mar. 9, 1976

Related U.S. Application Data

[63] Continuation-in-part of Ser. No. 508,278, Sep. 23, 1974, abandoned.

[51] Int. Cl.² .................... H04M 9/00; H04M 11/00; H04B 3/00
[52] U.S. Cl. .................................. 179/2 DP; 333/3; 340/147 SC
[58] Field of Search .............. 179/1 C, 2 R, 2 A, 2 C, 179/2 DP, 81 R, 175.3 S; 333/3; 340/147 SC

[56] References Cited

U.S. PATENT DOCUMENTS

| | | | |
|---|---|---|---|
| 3,527,891 | 9/1970 | Johnson | 179/2 A |
| 3,718,781 | 2/1973 | Angner et al. | 179/175.3 S |
| 3,879,579 | 4/1975 | Fretwell | 179/2 DP |
| 3,899,641 | 8/1975 | Etra | 179/2 DP |

*Primary Examiner*—George G. Stellar
*Attorney, Agent, or Firm*—Cesari and McKenna

[57] ABSTRACT

An automatic switching unit for connection to a modem at a remote site in a data communications network. The switching unit normally connects the modem to a primary data transmission path. If the primary path malfunctions, a central site operator can telephone the remote site and establish a secondary data transmission path. The switching unit answers the incoming calls and automatically disconnects the modem from the primary data transmission path. Once the primary data transmission path has been repaired, the central site operator causes the switching unit to return communications to the primary data transmission path. In one embodiment, this transfer can be made while maintaining communications over the secondary data transmission path.

50 Claims, 4 Drawing Figures

AUTOMATIC SWITCHING UNIT FOR DATA COMMUNICATIONS NETWORK

CROSS REFERENCE TO RELATED APPLICATION

This is a continuation-in-part application of U.S. Pat. Application Ser. No. 508,278 filed on Sept. 23, 1974 for an Automatic Switching Unit for Data Communications Systems now abandoned.

BACKGROUND OF THE INVENTION

This invention generally relates to modulated carrier communications networks and more specifically to networks with alternate data transmission paths.

Modulated carrier data communications networks convey data between a central site and one or more remote sites over telephone lines or other communications links. The central site typically comprises a digital data transmitter and receiver, such as a digital computer and its associated input/output control system. Each remote site also comprises a digital data transmitter and receiver, such as a peripheral unit.

At the central site, a modulator circuit receives the digital data from the central site transmitter and converts the data to appropriate modulated carrier signals for transmission over a data transmission path to a designated remote site. At the remote site, a demodulator circuit receives the incoming modulated carrier signal and converts it back to its original digital form for use by the data receiver. Similarly, a data transmitter at a remote site supplies data to its modulator for conversion to modulated carrier signals for transmission back to the central site where a demodulator converts the incoming modulated carrier signal back into digital form for the data receivers at the central site. Generally, a modulator circuit and a demodulator circuit at each site are packaged together in a "modem".

A single data transmitter and receiver at a central site may communicate with one or more remote sites, or "drops", over one or more separate communications links. Each communications link couples a central modem and a number of drops. Appropriate circuits at the central site and each remote site enable any one remote site to communicate with the central site. Once a particular drop is identified, no other drops on the link are enabled to respond for the duration of the communication.

In a typical communications network, the central site is connected to each remote site over a link or path comprising two pairs or sets of transmission lines to enable "full-duplex" operation. One pair carries modulated carrier signals to a remote site while the other carries signals from the remote site. These lines constitute primary data transmission paths. They are not merely two pairs of conductors. Rather they include switching elements, amplifier elements and other circuit elements as well as conductor elements that are common to telephone lines. A failure of any one of these elements can produce a primary data transmission path malfunction.

If the primary data transmission path constitutes the only connection between a remote site and a central site, a malfunction in the path terminates all communications with that remote site. Even if only one pair of transmission lines is malfunctioning, it normally is not possible to switch the modem from full duplex to "half-duplex" communications so all communications pass over one pair of lines due to the construction of the transmission lines.

There are available means for establishing a secondary, or back-up, data transmission path. Manually operated switching units are located at the central and remote sites in these networks. With these switching units, however, personnel at the remote site also must act to effect a change. Typically, these people are not technically trained, so personnel at the central site must coordinate the procedures for shifting between the primary and secondary paths. With these manual switching units, an additional data path (e.g., a third telephone line) must be used to coordinate the change over.

With manual switching units the network is operating exclusively over either the primary data transmission path or the secondary data transmission path. After a fault is ostensibly corrected, the secondary path is disconnected and communications are re-established over the primary data transmission path. If the primary data transmission path still malfunctions, the entire manual transfer procedure must be performed again.

Therefore, it is an object of this invention to provide at a remote site automatic switching between primary and secondary data transmission paths.

Another object of this invention is to provide an automatic switching unit which eliminates the need for any intervention by personnel at the remote site.

Another object of this invention is to provide an automatic switching unit which enables communications over both the primary and secondary data transmission paths simultaneously.

SUMMARY OF THE INVENTION

In accordance with one aspect of this invention, a switching unit connects to primary and secondary transmission paths in a data communications network and to a digital interfacing unit, such as a modem. If the primary transmission path malfunctions, an operator at a central site establishes communications over the secondary transmission path. The switching unit automatically shifts primary and secondary switching means to their astable states to disconnect the interfacing unit from the primary path and to the secondary transmission path. If the interfacing unit also includes a testing unit, the switching means thereafter can be conditioned to connect the testing unit to the secondary transmission path and the interfacing unit to the primary transmission path thereby to enable signals to pass over both transmission paths simultaneously.

This invention is pointed out with particularity in the appended claims. A more thorough understanding of the above and further objects and advantages of this invention may be attained by referring to the following description taken in conjunction with the accompanying drawings.

DESCRIPTION OF AN ILLUSTRATIVE EMBODIMENT

Figure 1:
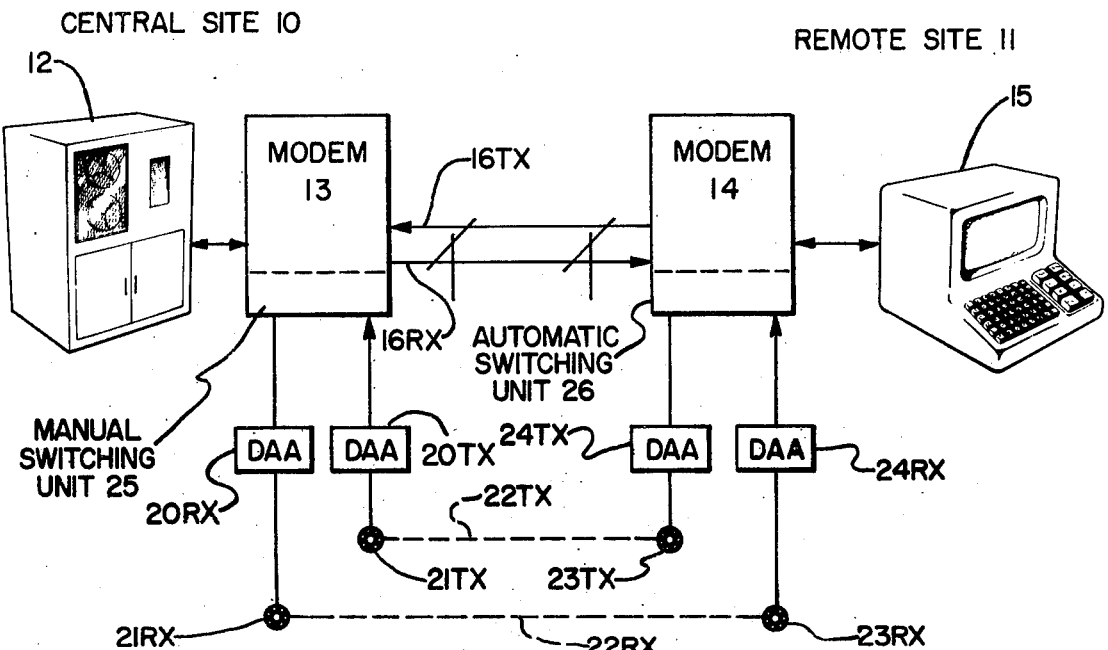
FIG. 1 depicts one embodiment of a data communications network adapted to use this invention.

FIG. 1 depicts a point-to-point data communications network for interconnecting a central site 10 and a remote site 11. In this embodiment, the central site 10 comprises a data processing system 12 with an input/output controller which supplies data to and receives digital data from a modem 13. The remote site 11 comprises a modem 14 and a terminal 15.

Two pairs of transmission lines 16TX and 16RX interconnect the modems 13 and 14 in a full duplex operating mode and constitute a primary data transmission path. Normally the lines 16 TX and 16RX are dedicated leased telephone lines.

A secondary data transmission path also is provided between the central site 10 and remote site 11 in FIG. 1. A data access arrangement 20 RX, and a standard telephone circuit represented by a telephone dial 21 RX, telephone lines and related circuits 22 RX, a telephone circuit 23 RX at the remote site and a data access arrangement 24 RX constitute that portion of the secondary data transmission path which couples signals to the remote site. The remaining portion of the secondary data transmission path carries signals to the central site and includes, at the central site, a data access arrangement 20 TX and telephone 21 TX which connect to a telephone circuit 22 TX and, at the remote site 11, a telephone 23 TX and data access arrangement 24 TX. At the central site a manual switching unit 25 connects to, and is normally housed with, the modem 13. An automatic switching unit 26 constructed in accordance with this invention connects to, and is normally housed with, the remote site modem 14.

With the basic system shown in FIG. 1, a central site operator can isolate the malfunction to the primary data transmission path, (i.e., the primary lines 16 TX or 16 RX or both) and then use the telephones 21 TX and 21 RX to call, conventionally, telephones 23 TX and 23 RX, respectively. When both calls are completed, switching unit 26 answers the incoming calls automatically, disconnects the primary data transmission path (i.e., lines 16 TX and 16 RX) from the modem 14 and connects the modem 14 to the transmission lines 22 TX and 22 RX. After the central site operator actuates the manual switching unit 25, communications between the modems 13 and 14 pass over the secondary data transmission path.

When the primary transmission path problems purportedly are corrected, the central site operator may then merely reset the manual switching unit 25 to couple signals over the primary data transmission lines 16 TX and 16 RX. Switching back to the primary data transmission path from the secondary data transmission path occurs automatically at the remote site. Therefore, there is no need for personnel at the remote site to perform any switching.

Figure 2:
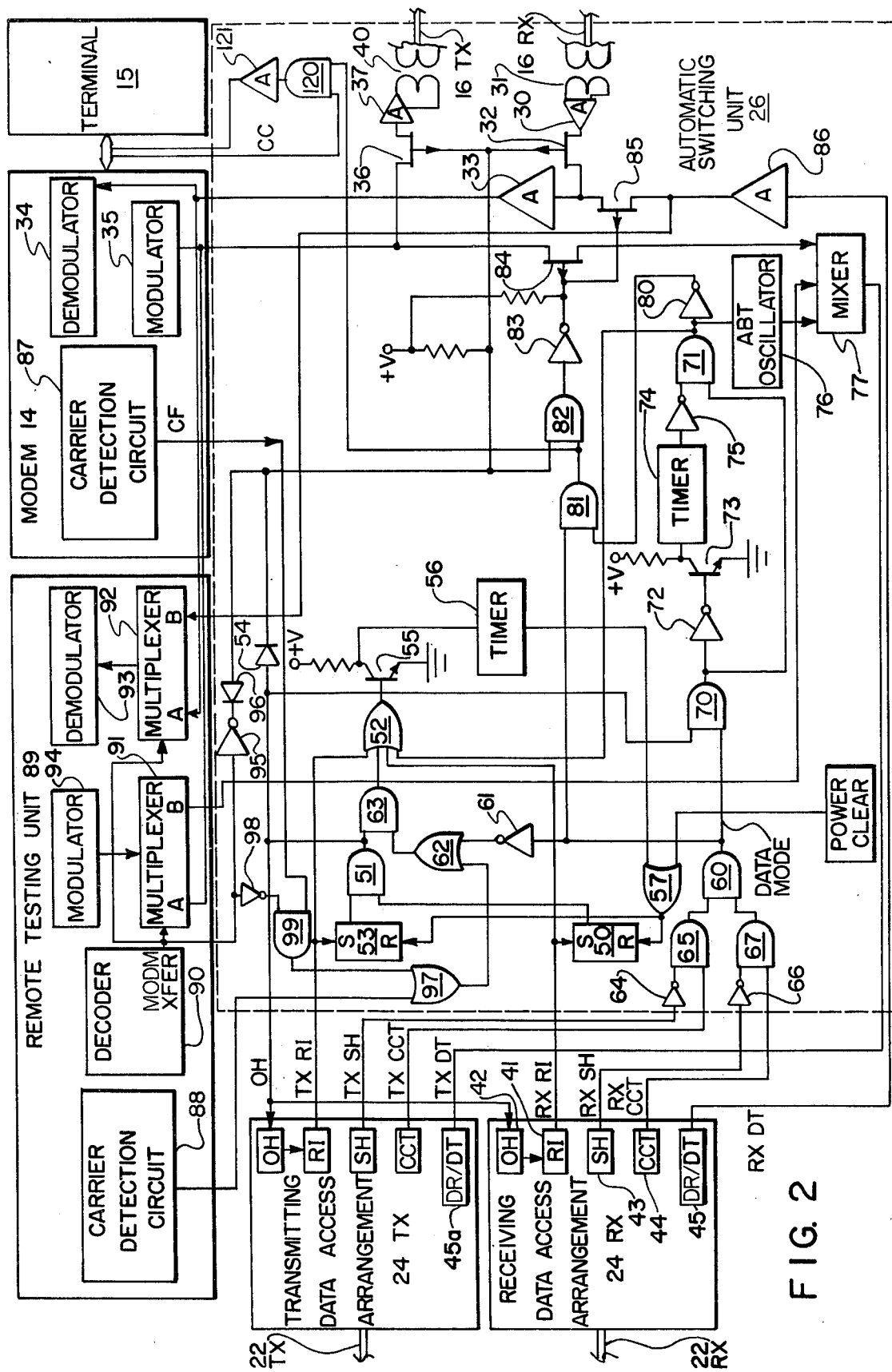
FIG. 2 is a schematic diagram, partially in block form, which illustrates a typical remote site, such as shown in FIG. 1, including a switching unit constructed in accordance with this invention that connects to conventional data access arrangements.

Now referring to FIG. 2, signals transmitted from the modem 13 are normally received over the primary transmission lines 16 RX in the primary data transmission path. These signals are coupled through the various shaping, amplifying and conditioning units, represented by an amplifier 30, and a transformer 31. A normally conducting switch, e.g., a field effect transistor 32, and an amplifier circuit 33 couple the incoming signals to a demodulator circuit 34 in the modem 14. Output signals from a modulator 35 in the modem 14 pass through another normally conducting switch, (e.g., a field effect transistor 36), an amplifier 37 and transformer 40 for transmission onto the transmission lines 16 TX in the primary data transmission path.

Whenever the primary data transmission path malfunctions, the central site operator places two telephone calls over the parallel secondary data transmission lines 22 TX and 22 RX. Data access arrangements 24 TX and 24 RX are also known as data couplers and are well known in the art. One such coupler is described in Bell System Data Communications Technical Reference, Data Couplers CBS and CBT for Automatic Terminals, published in August, 1970. In the embodiment shown in FIG. 2, these arrangements receive the calls. In the data access arrangement (DDA) 24RX, a ringing circuit 41 transmits a ringing signal RX RI in response to an incoming call. The RX RI ringing signal continues until the automatic switching unit 26 transmits an on-hook (OH) signal. An OH circuit 42 in the DAA 24RX receives this signal and terminates the ringing signal. A switch hook (SH) signal from an SH circuit 43 indicates whether the handset is on or off hook, and it normally is inactive. A CCT circuit 44 transmits an RX CCT signal when the transmission lines 22 RX are connected through the DAA 24 RX. These foregoing RI, SH and CCT signals constitute status signals for the data coupler or DAA 24RX. A DR/DT circuit 45 provides an analog signal path between the automatic switching unit 26 and the transmission lines 22 RX for data signals. The transmitting data coupler or DAA 24 TX comprises a similar circuit. A DR/DT circuit 45a is analogous to the DR/DT circuit 45 in the receiving data coupler 24 RX.

Now assuming that the central site operator telephones the receiving DAA 24 RX, the ringing circuit 41 transmits the RX RI signal thereby setting a latch 50 to enable an AND gate 51 and energize an OR gate 52 which provides a common disabling control input to a timing circuit described later. While the receiving DAA 24RX is still ringing, the central site operator telephones the transmitting DAA 24TX. The TX RI ringing signal sets a latch 53 that energizes the AND gate 51 thereby to transmit the on-hook (OH) signal.

When the receiving DAA 24RX and corresponding circuit in the transmitting DAA 24TX receive the OH signal, they terminate their respective RX RI and TX RI signals. The latches 50 and 53, however, normally remain set, so the AND gate 51 continues to transmit the OH signal even after the ringing signals terminate. The OH signal is also coupled through a diode 54 to turn off the field effect switching transistors 32 and 36 that act as primary switching means thereby to disconnect the modem 14 from the primary data transmission path.

The ringing signals constitute two inputs to the OR gate 52. When the OR gate 52 is energized, it turns on a transistor 55 which, when conducting, disables a timer 56 by shorting a timing capacitor in the timer 56. Circuits for implementing these capacitive timing circuits are known in the art. If the transistor 55 does not conduct, the timer 56 is enabled. After a predetermined interval (e.g., 7 seconds) the timer 56 energizes an OR gate 57 and resets both the latches. This terminates the OH signal from the AND gate 51 and re-establishes the connection between the primary data transmission path and the modem 14.

When the AND gate 51 first transmits the OH signal, a DATA MODE signal from an AND gate 60 is inactive, so an inverter 61 and an OR gate 62 enable an AND gate 63, which also receives the OH signal as an input. Thus, although the ringing signals terminate, the AND gate 63 energizes the OR gate 52 and disables the timer 56 so long as the OH signal is active and the DATA MODE signal is inactive.

Circuits in the DAA 24 TX and the DAA 24 RX transmit the SH and CCT status signals. Coincidental inactive SH and active CCT signals define a DATA MODE status for a corresponding DAA. Thus, an inverter 64 couples the TX SH signal to an AND gate 65 which also receives the TX CCT signal, so the AND gate 65 provides one input to the AND gate 60 when the DAA 24 TX is in the data mode. An inverter 66 and AND gate 67 provide a second input to the AND gate 60 when the receiving DAA 24 RX is in the data mode.

When the AND gate 60 produces the DATA MODE signal, the inverter 61 and OR gate 62 disable the AND gate 63, so the timer 56 begins to time its interval. Simultaneously, however, the OH and DATA MODE signals energize an AND gate 70 to enable an AND gate 71 and related circuits to produce an answer back tone (ABT). Whenever the AND gate 70 is energized, an inverter 72 turns off a switching transistor 73 to enable a capacitor in a timer 74 to charge. An inverter 75 provides a second signal to the AND gate 71. Thus, the AND gate 71 is energized simultaneously with the AND gate 70 and is de-energized after the interval determined by the timer 74. The AND gate 71 turns on an ABT oscillator 76 which transmits its answer back tone for the interval of the timer 74 (e.g., 1.5 seconds). The ABT signal from the ABT oscillator 76 passes through a mixer circuit 77 and back to the DR/DT circuit 45a in the transmitting DAA 24 RX. The AND gate 71 also energizes the OR gate 52 to disable the timer 56 so it can not begin to time a new interval until the ABT oscillator 76 turns off.

The automatic switching unit 26 effects a connection between the modem 14 and the secondary data transmission path when the ABT signal terminates. When the AND gate 70 is energized, both the DATA MODE signal from the AND gate 60 and a signal from an inverter 80, connected to the output of the AND gate 71, energize an AND gate 81. The signal from the AND gate 81 and the OH signal then energize another AND gate 82 so an inverter 83 turns on normally non-conducting switches, shown as field effect switching transistors 84 and 85, that act as secondary switching means to establish the secondary data transmission path to the modem 14. Incoming signals from the receiving transmission lines 22 RX thereafter pass through the DR/DT circuit 45, an amplifying circuit 86, the conducting field effect transistor 85 and the amplifier 33 to the demodulator 34. Signals being transmitted from the modulator 35 pass through the field effect transistor 84, the mixer 77 and the DR/DT circuit 45a in the transmitting DAA 24TX to be transmitted onto the transmission lines 22TX.

Figure 3:
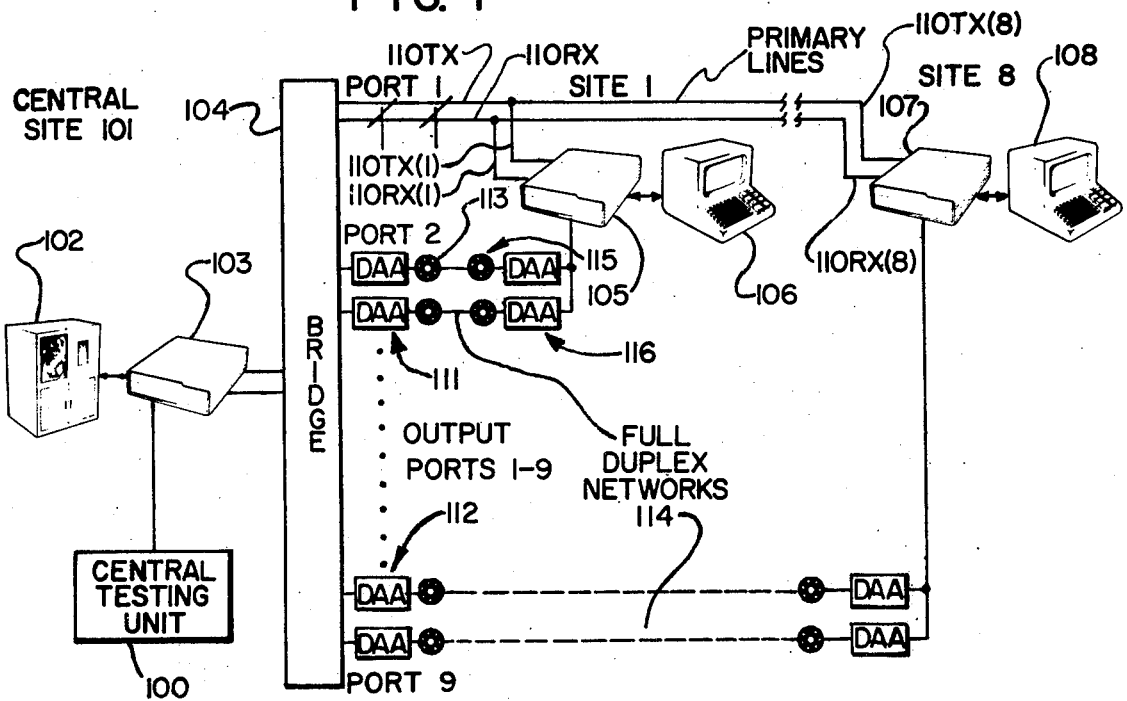
FIG. 3 illustrates another embodiment of a data communications network incorporating this invention.

When the central site operator hears the answer back tone, he actuates the manual switching unit 25 (FIG. 1). Communications then are carried on through the secondary data path. A carrier detected (CF) signal from a carrier detection circuit 87 in the modem 14 (FIG. 2) in a network as shown in FIG. 1 controls the timer 56 in a point-to-point network. Both the circuit 87 and a carrier detection circuit 88 in a remote testing unit 89 control the timer 56 (FIG. 2) in a network as shown in FIG. 3, and the necessary circuits are shown in FIG. 2. Regardless of the source, the CF signal must be transmitted before the timer 56 completes its interval to prevent a disconnection. The CF signal causes the OR gate 62 to be energized so the AND gate 63 and OR gate 52 disable the timer 56. Once this process is successfully completed, the secondary data transmission path carries the subsequent network communications.

When the problems with the primary data transmission path are corrected, the central site operator merely switches the manual switching unit 25 (FIG. 1) back to the primary data transmission path or hangs up the DAA 20TX. In either case, the modulated carrier is terminated, so the timer 56 resets the latches 50 and 53 after the defined interval. Assuming the central site is reconnected to the primary data transmission path, the switches 32 and 36 will reconnect the transmission lines 16TX and 16RX to the modem 14 while the switches 84 and 85 disconnect the modem 14 from the data access arrangements 24RX and 24TX.

Thus, the elements which carry and route the modulated carrier signals through the automatic switching unit 26, including the field effect transistors 32, 36, 84 and 85 together with the amplifiers 30, 33, 37 and 86 and transformers 31 and 40, constitute a monostable switching means. In its normal, or stable state, the first switches, or transistors 32 and 36 are conductive. However, in response to incoming signals from the data sets or DAA's 24RX and 24TX, the switching means responds to signals from AND gates 51 and 82 and shifts the monostable switching means to its astable state. In this state, second switches, or transistors 84 and 85, establish communications over the secondary data path. When the incoming signals from the data sets terminate, the timer 56 is enabled to reset the latches 50 and 53 and the monostable switching means returns to its stable state.

In accordance with another aspect of this invention, the central site operator can phase the reconnection of the system back to the primary data transmission path. A co-pending patent application entitled Modem Testing System, Ser. No. 503,625, deposited Sept. 6, 1974, describes a testing system for enabling a central site operator to monitor and test operations and correct malfunctions. One specific operation is a modem transfer operation. In this operation, a decoder in an addressed remote testing unit transmits a MODM XFER signal. If the remote site depicted in FIG. 2 is addressed, the MODM XFER signal from a decoder 90 acts as a selection signal for multiplexers 91 and 92 in the remote testing unit and energizes the AND gate 82.

During normal operations, the field effect transistors 32 and 36 couple all signals between the primary data transmission path, on the one hand, and the modem 14 and remote testing unit 89 on the other hand. Signals from the amplifier 33 are inputs to the demodulator 34 and to an "A" port of the multiplexer 92 in the remote testing unit. In the absence of the MODM XFER signal, the multiplexer 92 couples the signal at its "A" port to a demodulator 93. Likewise, signals from a modulator 94 are coupled from a common input to the multiplexer 91 to an "A" port and then through the conducting switch 36 onto the primary data transmission path.

When the central site operator establishes the secondary data transmission path through the field effect transistors 84 and 85, test signals to and from the remote testing unit 89 still pass through the "A" ports of the multiplexers 92 and 91. However, when the central site operator activates the modem transfer operation, the MODM XFER signal from the decoder 90 conditions the multiplexers 91 and 92 to connect their respective common terminals and the "B" ports. The MODM XFER signal also passes through an inverter 95 and an isolating diode 96 in the automatic switching unit 26 to disable the AND gate 82 and turn off the field effect switching transistors 84 and 85. This disconnects the secondary data transmission path from the modem 14 and re-establishes communications over the primary data transmission path. However, in this state, the remote testing unit 89 and a central testing unit 100 (in FIG. 3) still communicate over the secondary data transmission path because the OH and CF signals continue to keep the timer 56 disabled. Incoming signals from the DR/DT unit 45 pass through the amplifier 86 directly to the "B" port of multiplexer 92. Likewise, modulated test signals from the modulator 94 pass from the "B" port of the multiplexer 91 through the mixer 77 to the DR/DT circuit 45a in the transmitting data set 22TX. Thus, while the transmission lines 16TX and 16RX begin to carry data to and from the modem 14, the secondary data transmission path is retained. If any data transmission path problems still exist, the central site operator simply causes the remote testing unit 89 to terminate the MODM XFER signal and all data communications will revert to the secondary data transmission path.

FIG. 2 also depicts a circuit for conveying the CF signal to the OR gate 62. Any time the remote testing unit carrier detection circuit 88 transmits a CF signal, the CF signal energizes an OR gate 97 connected as one input to the OR gate 62. Normally an inverter 98, which receives the MODM XFER signal, enables an AND gate 99 to pass the CF signal from the detection circuit 87 to the OR gate 97. Thus, either CF signal maintains the secondary data transmission path, except in the transfer mode when only the CF signal from the remote testing unit 89 is controlling.

FIG. 3 shows an embodiment of a data communications network which also can use this aspect of the invention to advantage. In this network a central site 101 comprises a data processing system 102, a central site modem 103 together with the central testing unit 100 and a bridge circuit 104. In the bridge circuit 104 connected to the modem 103, data transmitted from the modem 103 appears at each of OUTPUT PORTS 1 through 9 of the bridge circuit 104. Likewise, incoming data at any of OUTPUT PORTS 1 through 9 appears at the input port.

The network shown in FIG. 3 also comprises a plurality of remote sites with representative sites being shown. SITE 1 includes a modem 105 and a terminal 106 and SITE 8 includes a modem 107 and a terminal 108. PORT 1 connects to a primary data transmission path comprising transmission lines 110TX and 110RX.

Each remote site modem is shown in pictorial form. Normally, each modem houses the modem itself (e.g., modem 14 in FIG. 2) as well as the corresponding remote testing unit and automatic switching unit (e.g., units 89 and 26 in FIG. 2).

In the network in FIG. 3 each of OUTPUT PORTS 2 through 9 connects to a DAA pair, DAA pairs 111 and 112 being shown. Each DAA pair connects to a remote site by means of a separate secondary transmission path. For example, the secondary data transmission path for SITE 1 comprises the DAA pair 111, telephones 113, telephone circuits 114, telephones 115 and another DAA pair 116 at SITE 1. The network shown in FIG. 3 thereby has secondary data transmission paths individually connected to each remote site. If a fault occurs in the feeder lines 110TX(1) or 110RX(1), the secondary data path can be established between the bridge 104 and SITE 1, while the other remote sites continue to communicate over the primary data transmission path. If the lines 110 fail, then separate secondary data transmission paths are established for each remote site.

Referring again to FIG. 2, a standard signal that passes from the modem 14 to the terminal 15 is a CC signal. The CC signal indicates whether the modem 14 is conditioned to receive or transmit data and is not in a test mode. While the unit 26 is transferring from the primary to the secondary data transmission paths, there is an interval during which the AND gate 81 is not energized and the terminal should be disabled during this interval. During that interval, the AND gate 81 disables an AND gate 120. Thus, the CC signal from the modem cannot be transmitted through the AND gate 120 and an amplifier 121 to the terminal 15. Once the secondary data path is established, the AND gate 81 is energized and the CC signal can again be transmitted to the terminal 15. Hence, this circuit provides a means for inhibiting the operation of the terminal 15 during these transfers.

Figure 4:
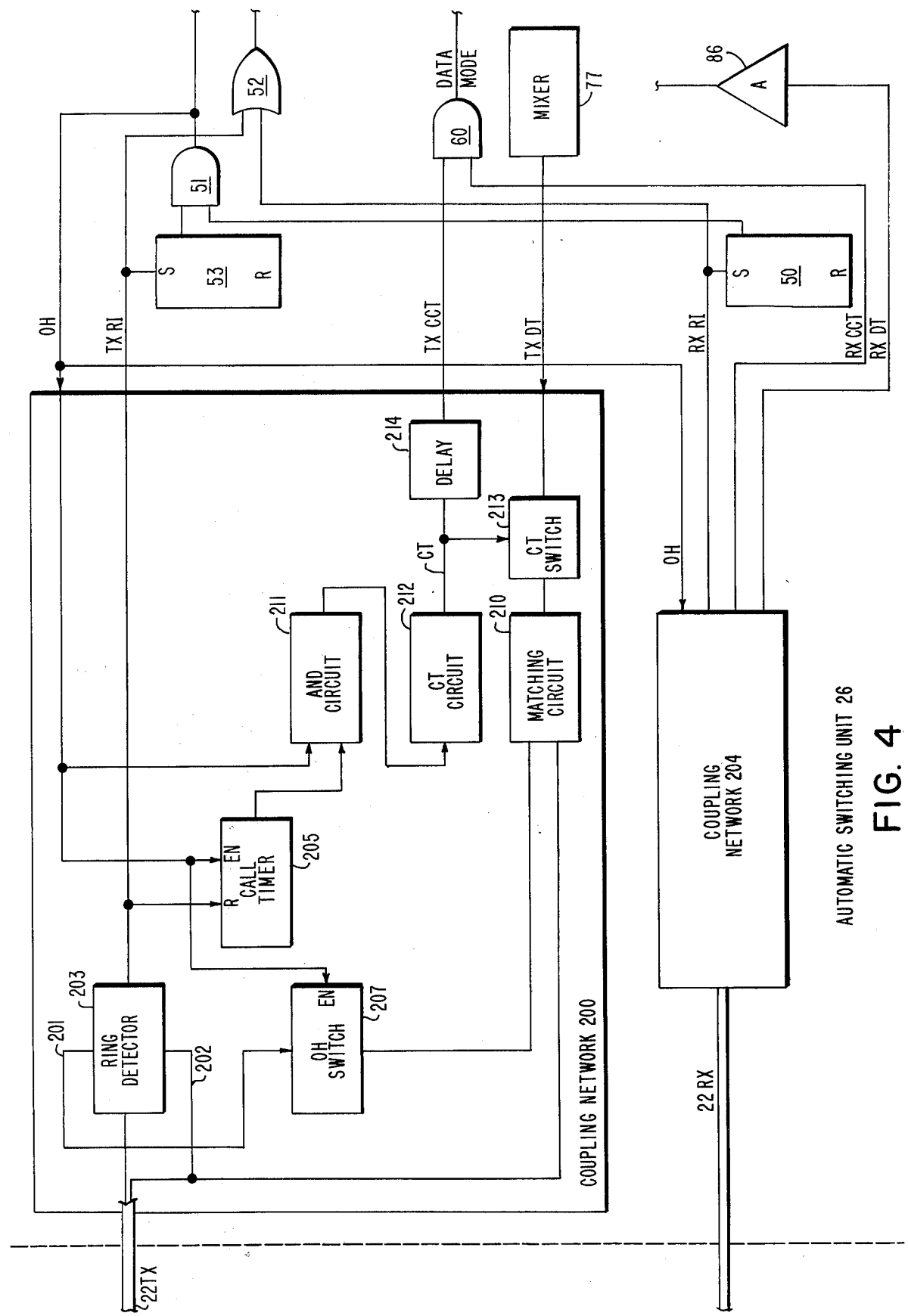
FIG. 4 depicts a modification of the circuit in FIG. 2 that connects directly to telephone lines.

As indicated, the automatic switching unit 26 in FIG. 2 connects through conventional data arrangements, or data couplers, to the secondary telephone lines 22TX and 22RX. FIG. 4 depicts a modification to the automatic switching unit 26 that enables a direct connection to the telephone lines when conventional data access arrangements are not available or necessary. Only a coupling network 200 that connects to the telephone lines 22TX is shown in detail together with its connections to the circuit elements shown in FIG. 2. Like reference numerals designate like circuit elements in FIGS. 2 and 4.

In FIG. 4, a pair of conductors 201 and 202 constitute the transmitting secondary telephone lines and related equipment 22TX. They connect to the coupling network 200 that is an integral part of this embodiment of the automatic switching unit 26.

When an operator dials the telephone number of the equipment (i.e., the equipment 23TX in FIG. 1) a ringing signal is transmitted over the telephone line 22TX. A conventional ring detector 203 transmits a TX RI signal in response to this ringing signal thereby to enable the AND gate 51 by setting the latch 53 and to energize the OR gate 52.

Likewise, a coupling network 204 contains a ring detector that transmits the RX RI signal when a ringing signal appears on the receiving ties and equipment 22RX. The RX RI signal also is applied to the OR gate 52. In addition, the RX RI signal sets the latch 50.

The TX RI signal also resets a call timer 205. When both the latches 50 and 53 are set, the AND gate 51 transmits the OH signal to energize the call timer 205. The OH signal also closes an OH switch 207. Corresponding circuit elements in the coupling network 204 operate in an analogous manner.

When the OH switches, such as the OH switch 207, are energized, they complete loop connections between the telephone lines, such as conductors 201 and 202, and the inputs of impedance matching circuits, such as a matching circuit 210.

After the call timer 205 completes its timing interval, it energizes an AND circuit 211, enabled by the OH signal, to condition a CT circuit 212 to transmit a CT signal that closes a CT switch 213. The impedance matching circuit 210 then is enabled to couple the TX DT signal from the mixer 77 to the lines 22TX. A similar CT switch and impedance matching circuit in the network 204 couples the lines and equipment 22RX and the amplifier 86. After an interval determined by a delay circuit 214, the coupling network 200 produces the TX CCT signal that is applied directly to the AND gate 60 thereby eliminating the inverter 64 and AND gate 65 in FIG. 2. These circuit elements, as well as the inverter 66 and the AND gate 67, can be eliminated because it is not necessary to use the SH signal that conventional data access arrangements transmit. This embodiment eliminates the need for a telephone handset.

When the coupling networks 200 and 204 transmit the TX CCT and RX CCT signals simultaneously, the AND gate 60 transmits the DATA MODE signal thereby to enable the switching operation to occur as previously described. Thus, when the automatic switching unit 26 in FIG. 2 is modified by adding the coupling networks 200 and 204 or some equivalent circuitry, the automatic switching unit 26 can connect directly to the telephone lines, such as the telephone lines 22TX and 22RX, respectively.

In summary, the automatic switching units 26 shown in detail in FIGS. 2 and 4 automatically switch a modem at a remote site between primary and secondary transmission paths without the need for any remote site operator intervention. The specific embodiments shown in FIGS. 2 and 4 are described in terms of particular arrangements of circuit elements. It will be apparent, however, that other elements and arrangements of elements can be used to implement this invention. Therefore, it is the object of the appended claims to cover all such variations and modifications as come within the true spirit and scope of this invention.

What we claim as new and desire to secure by Letters Patent of the United States is:

1. An automatic switching unit for connecting an interfacing unit selectively to a primary transmission path and to a secondary transmission path, the secondary transmission path being adapted to convey a secondary path condition signal, said automatic switching unit comprising:
   A. switching means having stable and astable states and including:
      i. a primary switching means for connecting, in its stable state, the interfacing unit to the primary transmission path, and
      ii. a secondary switching means for connecting, in its astable state, the interfacing unit to the secondary transmission path, and
   B. switch control means including:
      i. means for generating a control signal that shifts said primary and secondary switching means to their astable states in response to the secondary path condition signal, and
      ii. resetting means for terminating the control signal thereby to shift said primary and secondary switching means to their stable states.

2. An automatic switching unit as recited in claim 1 wherein the interfacing unit transmits as interface condition signal, said resetting means including means responsive to the interface condition signal for disabling said resetting means whereby the termination of the interface condition signal enables said resetting means to terminate the control signal.

3. An automatic switching unit as recited in claim 2 wherein a testing unit connects to the interfacing unit and selectively transmits a modem transfer signal to effect operation over both transmission paths, said resetting means additionally comprising means responsive to the modem transfer signal for causing said resetting means to terminate the control signal independently of the interface condition signal.

4. An automatic switching unit as recited in claim 3 wherein the testing unit transmits a carrier detected signal when it receives a modulated carrier signal, said resetting means additionally including means responsive to the carrier detected signal for disabling said resetting means whereby the interfacing unit communicates over the primary transmission path and the testing unit communicates over the secondary transmission path so long as the testing unit receives the modulated carrier signal.

5. An automatic switching unit for connecting an interfacing unit to a data communications network including a primary transmission path, a secondary transmission path and data coupling means connected to the secondary transmission path, the data coupling means transmitting a first status signal when data coupling means are active and the interfacing unit transmitting a condition signal when it is active, said automatic switching unit comprising:
   A. switching means having stable and astable states and including:
      i. a primary switching means for connecting, in its stable state, the interfacing unit to the primary data transmission path, and
      ii. secondary switching means for connecting, in its astable state, the interfacing unit through the data coupling means to the secondary data transmission path, and
   B. switch control means including:
      i. means for generating a control signal that shifts said primary and secondary switching means to their astable states in response to the status signal from the data coupling means, and
      ii. resetting means connected to said switch control means for terminating the control signal in response to the condition signal thereby to enable said switching means to return to their stable states and re-establish the connection with the primary transmission path.

6. An automatic switching unit as recited in claim 5 wherein the data coupling means transmits a ringing status signal as the first status signal to indicate a ringing condition on the secondary transmission path and a second status signal that indicates that the secondary transmission path is coupled through the data coupling means and wherein said switch control means additionally comprises:
   iii. conductor means for coupling the control signal to the data coupling means as an on-hook signal that terminates the ringing condition on the secondary transmission path, and
   iv. means responsive to the second status signal and the control signal for enabling said secondary switching means.

7. An automatic switching unit as recited in claim 6 wherein said resetting means comprises
   i. timing means for disabling said control signal generating means after a predetermined interval, and
   ii. means responsive to the receipt of one of the first status and control signals in the absence of the second status signal for disabling said timing means.

8. An automatic switching unit as recited in claim 6 wherein the secondary data transmission path comprises first and second pairs of transmission lines and the communications network includes a pair of data coupling means, each data coupling means being connected to one of the secondary transmission line pairs and being adapted for transmitting a ringing signal, said control signal transmitting means comprising i. first and second latching means having set and cleared states, each latching means being connected to receive a corresponding one of the ringing signals to be set thereby, and ii. an AND gate connected to the outputs of said latching means for transmitting the control signal when both said latching means are in the set condition, said resetting means clearing both said latching means to terminate the control signal.

9. An automatic switching unit as recited in claim 6 additionally comprising an answer back signal circuit including:

i. an answer back tone oscillator for transmitting answer back tone signals onto the secondary transmission path, ii. a second timing means for enabling said answer back tone oscillator for a second predetermined interval, and iii. means responsive to the coincidence of the control and second status signals for enabling said second timing means whereby the answer back tone is transmitted onto the secondary transmission path for a predetermined interval, the output of said second timing means disabling said resetting means.

10. An automatic switching unit as recited in claim 6 wherein the communications network conveys data to the interfacing unit as a modulated carrier signal and transmits a carrier detected signal as the condition signal, said resetting means being enabled in response to the control signal when the carrier detected signal is absent.

11. An automatic switching unit as recited in claim 5 wherein a testing unit connects to the interfacing unit and selectively transmits a modem transfer signal to effect operation over both transmission paths, said resetting means additionally comprising means responsive to the modem transfer signal for causing said resetting means to terminate the control signal independently of the interface condition signal.

12. An automatic switching unit as recited in claim 11 wherein the testing unit transmits a carrier detected signal when it receives a modulated carrier signal, said resetting means additionally including means responsive to the carrier detected signal for disabling said resetting means whereby the interfacing unit communicates over the primary transmission path and the testing unit communicates over the secondary transmission path so long as the testing unit receives the modulated carrier signal.

13. An automatic switching unit for connecting an interfacing unit to communications network including a primary transmission path and a secondary transmission path, the interfacing unit transmitting a condition signal when it is active, said automatic switching unit comprising:

A. switching means having stable and astable states and including:

i. a primary switching means for connecting, in its stable state, the interfacing unit to the primary transmission path, and ii. a secondary switching means for connecting, in its astable state, the interfacing unit to the secondary data transmission path, B. coupling means for connecting said secondary switching means to the secondary transmission path, including means for transmitting a first status signal in response to a first condition on the secondary data transmission path, and C. switch control means including:

i. means connected to said coupling means for generating a control signal that shifts said switching means to their astable states in response to the first status signal from said coupling means, and ii. resetting means connected to said switch control means for terminating the control signal in response to the condition signal thereby to enable said switching means to return to their stable states and re-establish the connection with the primary transmission path.

14. An automatic switching unit as recited in claim 13 wherein the first status signal indicates a ringing condition on the secondary transmission path, B. said data coupling means additionally including i. coupling circuit means for connecting the secondary transmission path and said switching means, and ii. means for transmitting a second status signal when said coupling circuit means does connect the secondary transmission path and said switching means, and C. said switch control means including:

i. a conductor for coupling the control signal to said data coupling means to terminate the first condition on the secondary transmission path from said coupling means, and ii. means responsive to the second status signal and control signals for enabling said secondary switching means.

15. An automatic switching unit as recited in claim 14 wherein said resetting means comprises i. timing means for disabling said control signal generating means after a predetermined interval, and ii. means responsive to the receipt of one of the first status and control signals in the absence of the second status signal for disabling said timing means.

16. An automatic switching unit as recited in claim 14 wherein the secondary data transmission path comprises first and second pairs of telephone lines, said coupling means including first and second coupling networks, each said coupling network being connected to one of the telephone line pairs and including means for transmitting a ringing signal, said control signal transmitting means comprising:

i. first and second latching means having set and cleared states, each latching means being connected to receive a corresponding one of the ringing signals to be set thereby, and ii. an AND gate connected to the outputs of said latching means for transmitting the control signal when both said latching means are in the set condition, said resetting means clearing both said latching means to terminate the control signal.

17. An automatic switching unit as recited in claim 14 additionally comprising:

E. an answer back signal circuit including:
  i. an answer back tone oscillator for transmitting answer back tone signals onto the secondary transmission path,
  ii. a second timing means for enabling said answer back tone oscillator for a second predetermined interval, and
  iii. means responsive to the coincidence of the control and second status signals for enabling said second timing means whereby the answer back tone is transmitted onto the secondary transmission path for a predetermined interval, the output of said second timing means disabling said resetting means.

18. An automatic switching unit as recited in claim 14 wherein the communications network conveys data to the interfacing unit as a modulated carrier signal and transmits a carrier detected signal as the condition signal, said resetting means being enabled in response to the control signal when the carrier detected signal is absent.

19. An automatic switching unit as recited in claim 13 wherein a testing unit connects to the interfacing unit and selectively transmits a modem transfer signal to effect operation over both transmission paths, said resetting means additionally comprising means responsive to the modem transfer signal for causing said resetting means to terminate the control signal independently of the interface condition signal.

20. An automatic switching unit as recited in claim 19 wherein the testing unit transmits a carrier detected signal when it receives a modulated carrier signal, said resetting means including means responsive to said carrier detected signal for disabling said resetting means whereby the interfacing unit communicates over the primary transmission path and the testing unit communicates over the secondary transmission path so long as the testing unit receives the modulated carrier signal.

21. An automatic switching unit for connection in a data communications network including a central site, at least one remote site, a primary data transmission path between the central site and each remote site, a secondary data transmission path between the central site and a remote site, a remote site including a modem with modulation and demodulation means and a testing means with means for detecting the receipt of a modulated carrier test signal in the testing unit, said automatic switching unit including
  A. primary switching means for connection in circuit between the modulation and demodulation means in the modem and the primary data transmission path,
  B. secondary switching means for connection in circuit between the modulation and demodulation means in the modem and the secondary transmission path, and
  C. switch control means that connect to the secondary transmission path for controlling said primary and secondary switching means, said switch control means including
    i. means responsive to a first condition on the secondary transmission path for transmitting an on-hook signal,
    ii. means responsive to the on-hook signal and second conditions on the secondary data transmission path for transmitting a data mode signal,
    iii. means responsive to the on-hook signal for opening said primary switching means to thereby disconnect said modem and the primary data transmission path,
    iv. means responsive to the on-hook signal and the data mode signal for transmitting an answer back tone over the secondary transmission path,
    v. means responsive to the receipt of the on-hook signal and data mode signal for closing said secondary switching means to establish communications over the secondary data transmission path, and
    vi. resetting means for terminating the on-hook signal to re-establish transmission over the primary data transmission path, said resetting means including
      a. an interval timer to disable said on-hook signal transmitting means at the end of a predetermined interval, and
      b. means responsive to the absence of the first condition on the secondary transmission path, the absence of an answer back signal, and the absence of either of the on-hook signal or carrier detection signal for enabling said timer to complete the interval and disable the on-hook signal transmitting means.

22. An automatic switching unit as recited in claim 21 wherein the remote testing unit includes means for transmitting a modem transfer signal, said switch control means including means responsive to the modem transfer signal for terminating the on-hook signal independently of the carrier detection signal thereby to establish communications with the modem over the primary transmission path and with the testing unit over the secondary transmission path, so long as the testing unit receives the modulated carrier test signal.

23. A method for controlling communications in a data communications network that includes a central site with a data unit for transmitting and receiving the communications and a switching unit, a remote site, and a primary communications path that normally is used during communications between the central and remote sites, said method comprising the steps, in order, of:
  A. establishing, at the central site, communications between the switching unit at the central site and an alternate communications path from the remote site that is in parallel with the primary communications path,
  B. establishing, at the remote site, communications between the remote site and the alternate communications path in response to said establishment of communications between the switching unit and the alternate communications path,
  C. isolating the remote site from the primary communications path after communications are established between the switching unit at the central site and the remote site over the alternate communications path, and
  D. activating the switch unit to establish communications between the data unit and the remote site over the alternate communications path.

24. A method as recited in claim 23 additionally comprising the steps of:
  D. terminating, at the central site, communications between the central site and the alternate communications path, and
  E. re-establishing, at the remote site, communications between the remote site and the primary data communications path in response to said termination.

25. A method as recited in claim 23 wherein communications between the central and remote sites include disparate signals including data signals and test signals, the test signals representing test information that includes test commands and test data, said method additionally comprising the steps of:
   D. decoding the test commands, and
   E. controlling said isolation of the primary communications path in response to said test command decoding.

26. A method as recited in claim 25 wherein the data and test signals are constituted by modulated carrier signals having carrier signals at diverse frequencies, said method additionally comprising the steps of:
   F. terminating the test signals over the alternate communications path thereby to interrupt the test signal carrier signal, and
   G. re-establishing, at the remote site, communications of the test and data signals over the primary communications path in response to said termination.

27. A method as recited in claim 25 wherein the test commands include transfer commands, said isolating step including the selective switching of communications of the data signals over the primary and alternate communications paths in response to said decoding of the transfer commands.

28. A method as recited in claim 27 wherein said selected switching includes switching communications of the data signals from the primary communications path to the alternate communications path in response to said decoding of one of the transfer commands.

29. A method as recited in claim 27 wherein said selected switching includes switching of communications of the data signals from the alternate communications path to the primary communications path in response to said decoding of one of the transfer commands.

30. A method as recited in claim 29 wherein the data and test signals are constituted by modulated carrier signals having carrier signals at diverse frequencies, said method additionally comprising the steps of:
   F. terminating the test signals over the alternate communications path thereby to interrupt the test signal carrier signal, and
   G. re-establishing, at the remote site, communications of the test and data signals over the primary communications path in response to said termination.

31. A method as recited in claim 29 wherein said selective switching additionally includes switching of communications of the data signals from the primary communications path to the alternate communications path in response to said decoding of an other of the transfer commands.

32. A method as recited in claim 31 wherein the data and test signals are constituted by modulated carrier signals having carrier signals at diverse frequencies, said method additionally comprising the steps of:
   F. terminating the test signals over the alternate communications path thereby to interrupt the test carrier signals, and
   G. re-establishing, at the remote site, communications of the test and data signals over the primary communications path in response to said termination.

33. Apparatus for controlling communications in a data communications network that includes a central site, a remote site, and a primary communications path that normally is used during communications between the central and remote sites, said apparatus comprising:
   A. switching means at the central site,
   B. means at the central site for establishing communications between said switching means and an alternate communications path from the remote site that is in parallel with the primary communications path,
   C. means at the remote site for establishing communications between the remote site and the alternate communications path in response to the establishment of communications between said switching means and the alternate communications path, and
   D. means for isolating the remote site from the primary communications path after communications are established over the alternate communications path, said switching means establishing communications between the central site and the alternate communications path after said isolating means are activated.

34. Apparatus as recited in claim 33 additionally comprising means at the remote site for re-establishing communications between the remote site and the primary data communications path in response to the termination of communications between said switching means and the alternate communications path.

35. Apparatus as recited in claim 33 wherein communications between the central and remote sites include data signals and test signals that represents test information including test commands and test data, said apparatus additionally comprising:
   D. means for decoding the test commands, and
   E. means for controlling said remote site isolating means in response to said decoding means.

36. Apparatus as recited in claim 35 wherein the data signals and the test signals are constituted by modulated carrier signals having carrier signals of diverse frequencies, said apparatus additionally comprising means at the remote site for re-establishing communiations of the test and data signals over the primary communiations path in response to a termination of the test signal carrier signal over the alternate communications path.

37. Apparatus as recited in claim 35 wherein the test commands includes transfer commands, said isolating means including means responsive to said decoding means for selectively switching communications of the data signals over the primary and alternate communications path when said decoder receives the transfer commands.

38. Apparatus as recited in claim 37 wherein said selective switching means includes means responsive to one of the transfer commands for switching communications of the data signals from the primary communications path to the alternate communications path.

39. Apparatus as recited in claim 37 wherein said selective switching means includes means responsive to one of the transfer commands for switching communications of the data signals from the alternate communications path to the primary communications path.

40. Apparatus as recited in claim 39 wherein the data and test signals are constituted by modulated carrier signals having carrier signals of diverse frequencies, said apparatus additionally comprising means at the remote site for re-establishing communications of the test and data signals over the primary communications path in response to the interruption of the test signal carrier signal.

41. Apparatus as recited in claim 39 wherein said selective switching means additionally includes means responsive to a second transfer command for switching communications of the data signals from the primary communications path to the alternate communications path.

42. Apparatus as recited in claim 41 wherein the test and data signals are constituted by modulated carrier signals having carrier signals of diverse frequencies, said apparatus additionally comprising means at the remote site for re-establishing communications of the test and data signals over the primary communications path in response to the interruption of the test signal carrier signal.

43. A method for controlling communications in a data communications network that includes a central site, a remote site, a primary communications path that normally is used during communications between the central and remote sites, and means at the central site for transmitting and receiving data signals and test signals, the test signals defining test commands and test data, said method comprising the steps of:
  A. establishing communications for the test and data signals between an alternate communications path between the remote site and the central site, the alternate communications path being in parallel with the primary communications path,
  B. establishing, at the remote site, communications between the remote site and the alternate communications path in response to said establishment of communications between the central site and the alternate communications path,
  C. isolating the remote site from the primary communication path after communications are established over the alternate communications path, both the data signals and test signals thereafter being communicated between the central and remote sites over the alternate communications path, and
  D. thereafter switching the communications of the data signals between the primary communications path and the alternate communications path in response to first and second of the test commands that are conveyed to the remote site over the alternate communications path.

44. A method as recited in claim 43 wherein the data and test signals are constituted by modulated carrier signals having carrier signals at diverse frequencies, said method additionally comprising the steps of:
  E. terminating the test signals over the alternate communications path thereby to interrupt test carrier signal, and
  F. re-establishing, at the remote site, communications of the test and data signals over the primary communications path in response to said termination.

45. A method as recited in claim 43 additionally comprising the steps of:
  E. terminating, at the central site, communications between the central site and the alternate communications path, and
  F. re-establishing, at the remote site, communications between the remote site and the primary communications path in response to said termination.

46. A method as recited in claim 45 wherein the data and test signals are constituted by modulated carrier signals having carrier signals at diverse frequencies, said method additionally comprising the steps of:

G. terminating the test signals over the alternate communications path thereby to interrupt test carrier signal, and
  H. re-establishing at the remote site, communications of the test and data signals over the primary communications path in response to said termination.

47. Apparatus for controlling communications in a data communications network that includes a central site, a remote site, a primary communications path that normally is used during communications between the central and remote sites and means at the central site for transmitting and receiving data signals and test signals, the test signals defining test commands and test data, said apparatus comprising:
  A. means for establishing communications for the test signals and the data signals between an alternate communications path from the remote site and the central site, the alternate communications path being in parallel with the primary communications path,
  B. means for establishing, at the remote site, communications between the remote site and the alternate communications path in response to said establishment of communications between the central site and the alternate communications path,
  C. means for isolating the remote site from the primary communications path after communications are established over the alternate communications path, and
  D. means for controlling the transfer of data signals between the remote site and the primary communications path in response to first and second of the path commands.

48. Apparatus as recited in claim 47 wherein the test and data signals are constituted by modulated carrier signals having signals of diverse frequencies, said apparatus additionally comprising:
  E. means for decoding the test commands from the modulated test carrier signal,
  F. means for controlling said remote site isolating means in response to said decoding means, and
  G. means for re-establishing communications of the test and data signals over the primary communications path in response to a termination of the test signal carrier signal over the alternate communications path.

49. Apparatus as recited in claim 47 wherein said apparatus additionally comprises:
  E. means at the remote site for re-establishing communications of the test and data signals over the primary communications path in response to a termination of test signals over the alternate communications path.

50. Apparatus as recited in claim 49 wherein the data signals and test signals are constituted by modulated carrier signals having carrier signals of diverse frequencies, said apparatus additional comprising:
  F. means at the remote site for demodulating the modulated carrier signals,
  G. means for decoding the test commands from the demodulated test signals, and
  H. means for controlling said remote site isolating means in response to said decoding means.

* * * * *

UNITED STATES PATENT AND TRADEMARK OFFICE
CERTIFICATE OF CORRECTION

PATENT NO. : 4,076,961
DATED : February 28, 1978
INVENTOR(S) : Holsinger et al

It is certified that error appears in the above-identified patent and that said Letters Patent are hereby corrected as shown below:

Column 5, line 35, is "can not" should be --cannot--.
Column 9, line 63, is "as" should be --an--.
Column 16, line 27, is "represents" should be --represent--.
Column 16, line 37, is "communiations" should be --communications--.
Column 16, line 38, is "communiations" should be --communications--.
Column 16, line 42, is "includes" should be --include--.
Column 18, line 3, is "signal," should be --signals--.
Column 18, line 57, is "additional" should be --additionally--.

Signed and Sealed this

Fourteenth Day of October 1980

[SEAL]

Attest:

SIDNEY A. DIAMOND

Attesting Officer

Commissioner of Patents and Trademarks